US009940894B2

(12) United States Patent
Du

(10) Patent No.: US 9,940,894 B2
(45) Date of Patent: Apr. 10, 2018

(54) CIRCUIT OF DISPLAY PANEL

(71) Applicant: SHENZHEN CHINA STAR OPTOELECTRONICS TECHNOLOGY CO., LTD., Shenzhen, Guangdong (CN)

(72) Inventor: Peng Du, Guangdong (CN)

(73) Assignee: SHENZHEN CHINA STAR OPTOELECTRONICS TECHNOLOGY CO., LTD, Shenzhen (CN)

( * ) Notice: Subject to any disclaimer, the term of this patent is extended or adjusted under 35 U.S.C. 154(b) by 0 days.

(21) Appl. No.: 14/777,170

(22) PCT Filed: Jan. 22, 2015

(86) PCT No.: PCT/CN2015/071299
§ 371 (c)(1),
(2) Date: Oct. 1, 2015

(87) PCT Pub. No.: WO2015/110032
PCT Pub. Date: Jul. 30, 2015

(65) Prior Publication Data
US 2016/0322019 A1 Nov. 3, 2016

(30) Foreign Application Priority Data
Jan. 23, 2014 (CN) .......................... 2014 1 0033873

(51) Int. Cl.
*G06F 3/038* (2013.01)
*G09G 5/00* (2006.01)
*G02F 1/136* (2006.01)
*G09G 3/20* (2006.01)

(52) U.S. Cl.
CPC ............... *G09G 5/003* (2013.01); *G09G 3/20* (2013.01); *G09G 2300/0413* (2013.01); *G09G 2300/0426* (2013.01); *G09G 2300/08* (2013.01); *G09G 2300/0819* (2013.01); *G09G 2330/04* (2013.01)

(58) Field of Classification Search
CPC ...... G06F 3/044; G09G 3/3677; G02F 1/1368
See application file for complete search history.

(56) References Cited

U.S. PATENT DOCUMENTS

2006/0022204 A1* 2/2006 Steer .................... G09G 3/3233 257/79
2006/0044501 A1* 3/2006 Mizusako ............. G02F 1/1337 349/123
2010/0053489 A1* 3/2010 Kang ................ G02F 1/136204 349/48

FOREIGN PATENT DOCUMENTS

| | | | |
|---|---|---|---|
| CN | 1766722 | A | 5/2006 |
| CN | 101097312 | A | 1/2008 |
| CN | 101285974 | A | 10/2008 |
| CN | 102331644 | A | 1/2012 |

(Continued)

*Primary Examiner* — Nan-Ying Yang

(57) ABSTRACT

The present embodiment is provided for a circuit of display panel, wherein comprising a signal wire extending along the first direction, a public electrode wire extending along the second direction, a pixel electrode, the first discharge circuit and the second discharge circuit, each signal wire is electrical connecting with the public electrode wire with the first discharge circuit and the second discharge circuit, the first discharge circuit and the second discharge circuit is in series, the pixel electrode is connecting on the intersection point between the first discharge circuit and the second discharge circuit.

7 Claims, 1 Drawing Sheet

(56) References Cited

FOREIGN PATENT DOCUMENTS

| | | | |
|---|---|---|---|
| CN | 102629008 | A | 8/2012 |
| CN | 103794606 | A | 5/2014 |
| JP | H11-52427 | A | 2/1999 |
| TW | 201009467 | A | 3/2010 |
| WO | WO2004072941 | A2 | 8/2004 |

* cited by examiner

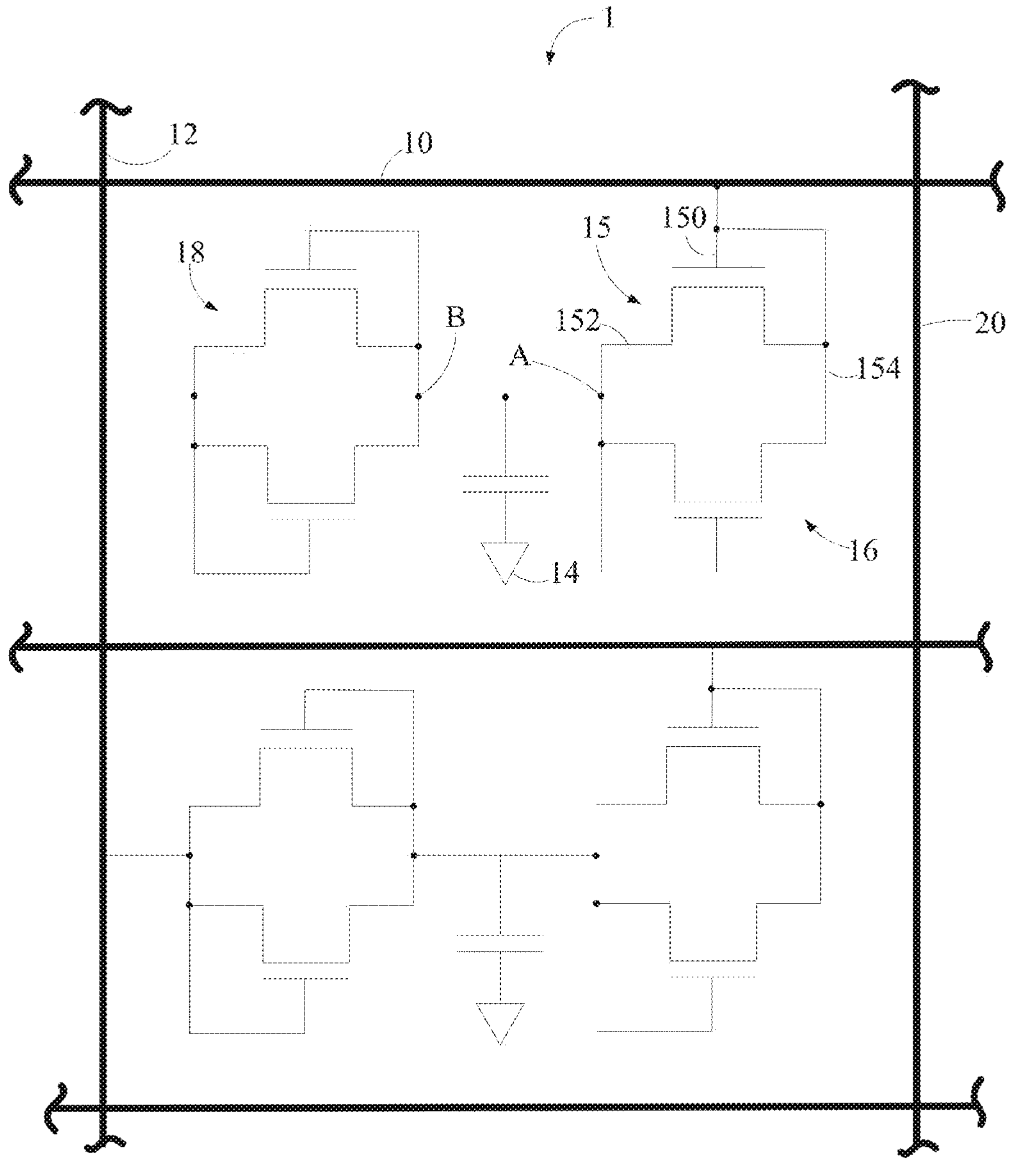
1
12
10
18
15
150
B
152
20
A
154
14
16

CIRCUIT OF DISPLAY PANEL

FIELD OF THE INVENTION

The present invention relates to a circuit of display panel.

BACKGROUND OF THE INVENTION

In the traditional display panel, a dummy pixel area, a public electrode circuit, electrostatic protection circuit, a fan-out and a bonding pad which is located inside or outside of the periphery line area. Therein, the dummy pixel area is provided for keep the stray capacitance, the impedance and other parameters around the display panel the same as the pixel unit inside the display panel, so as to prevent difference on display effect between the outside or inside of the display panel. Electrostatic protection circuit is electrically connecting to the public electrode wire with the signal wire (such as signal wire or date wire) by a special wire, so as to prevent the damage on the circuit of the display panel from electrostatic protection during the manufacture. Owing to the above circuit occupy a lot of space outside the display panel, so that is not good for the display panel with narrow border design.

Therefore, it's necessary to provide a circuit of display panel to overcome the about problem.

SUMMARY OF THE INVENTION

For resolve the above technology problem, the present embodiment is provided for a circuit of display panel, wherein comprising a signal wire extending along the first direction, a public electrode wire extending along the second direction, a pixel electrode, the first discharge circuit and the second discharge circuit, each signal wire is electrical connecting with the public electrode wire with the first discharge circuit and the second discharge circuit, the first discharge circuit and the second discharge circuit is in series, the pixel electrode is connecting on the intersection point between the first discharge circuit and the second discharge circuit.

Preferably, the first direction is vertical to the second direction.

Preferably, a plurality of pixel units are combined by the intersecting with two parallel signal wires adjoining and the two public electrode wires, the pixel units are arranging in array, and a pixel electrode is found from each pixel unit.

Preferably, the pixel unit is a dummy pixel unit.

Preferably, the first discharge circuit and the second discharge circuit comprising two thin film transistors, and each thin film transistor comprising a grid electrode, a source electrode and a drain electrode respectively, the grid electrode is electrically connecting with the drain electrode, the source electrode and the drain electrode of one thin film transistor are electrical connecting with the drain electrode and the source electrode of another thin film transistor of the first discharge circuit and the second discharge circuit to be a close loop.

Preferably, the connect point of the drain electrode and the source electrode in the first discharge circuit is electrical connecting with another connect point of the drain electrode and the source electrode in the second discharge circuit.

Preferably, the connect point is public electrode wire is electrically connecting with together, which the connect point of the drain electrode and the source electrode is form with the second discharge circuit and the first discharge circuit.

Preferably, the connect point is public electrode wire is electrically connecting with together, which the connect point of the drain electrode and the source electrode is form with the second discharge circuit and the first discharge circuit.

Preferably, the signal wire is selected from the signal scan wire or the date wire for transferring the display signal.

Preferably, the pixel electrode is a vertical distribution pixel electrode with a plurality of slots.

Compared to the prior art, the circuit of display panel of the present invention comprises a discharge circuit making from the thin film transistors of the dummy pixel unit to discharge for electrostatic protecting, and in the pixel electrode of the dummy pixel, the load of pixel unit around the display panel is keeping the same as the load of the pixel unit inside the display panel. Therefore, there is not install an independent electrostatic protection circuit outside the display panel, then to be an advantage for the border space of the display panel with narrow border design.

BRIEF DESCRIPTION OF THE DRAWINGS

In order to illustrate more clearly the technology in the present embodiment of the prior art, the following making a sample introduction with the drawings.

FIG. 1 is a schematic perspective view of a circuit of display panel according to the present invention.

DETAILED DESCRIPTION OF THE PREFERRED EMBODIMENTS

The following describe is introducing the present invention.

Refer to FIG. 1, the circuit of display panel of the present invention 1 comprising a signal wire 10 extending along the first direction, a public electrode wire 12 extending along the second direction, a pixel electrode 14, the first discharge circuit 16 and the second discharge circuit 18. Each signal wire 10 is electrical connecting with the public electrode wire 12 with the first discharge circuit 16 and the second discharge circuit 18, the first discharge circuit 16 and the second discharge circuit 18 is in series, the pixel electrode 14 is connecting on the intersection point between the first discharge circuit 16 and the second discharge circuit 18. In the present embodiment, the first direction is vertical to the second direction, that is to say, the signal wire 10 is vertical to the public electrode wire 12.

A plurality of pixel units 20 are combined by the intersecting with two parallel signal wires 10 adjoining and the two public electrode wires 12. The pixel units 20 are arranging in array, and a pixel electrode 14 is found from each pixel unit 20. One of signal wire 10 is electrically connecting the public electrode wire 12 to be form the pixel unit 20, wherein the pixel unit 20 is assembling by the first discharge circuit 16 and the second discharge circuit 18 in series. The signal wire 10 is selected from the signal scan wire or the date wire for transferring the display signal. In the present embodiment, the pixel unit 20 is a dummy pixel unit.

The first discharge circuit 16 and the second discharge circuit 18 comprising two thin film transistors (TFT) 15, and each thin film transistor 15 comprising a grid electrode 150, a source electrode 152 and a drain electrode 154 respectively, the grid electrode 150 is electrically connecting with the drain electrode 154. The source electrode 152 and the drain electrode 154 of one thin film transistor 15 are electrical connecting with the drain electrode 154 and the source electrode 152 of another thin film transistor 15 of the first discharge circuit 16 and the second discharge circuit 18 to be a close loop. The connect point of the drain electrode 154 and the source electrode 152 in the first discharge circuit 16 is electrical connecting with another connect point of the drain electrode 154 and the source electrode 152 in the second discharge circuit 18. The grid electrode 150 of the TFT 15 in the first discharge circuit 16 is electrically connecting with the signal wire 10. One of drain electrode 154 in the first discharge circuit 16 is electrically connecting with the source electrode 152 on the connect point A, in the same way, one of drain electrode 154 in the second discharge circuit 18 is electrically connecting with the source electrode 152 on the connect point B. The connect point of the drain electrode 154 and the source electrode 152 is form with the second discharge circuit 18 and the first discharge circuit 16, the public electrode wire 12 is electrically connecting with the second discharge circuit 18 together on the connect point. The pixel electrode 14 is electrically connecting on the connect point with the first discharge circuit 16 and the second discharge circuit 18. In the present embodiment, the pixel electrode 14 is a vertical distribution pixel electrode 14 with a plurality of slots.

The circuit of display panel 1 of the present invention comprises a discharge circuit making from the thin film transistors of the dummy pixel unit to discharge for electrostatic protecting, and in the pixel electrode 14 of the dummy pixel, the load of pixel unit 20 around the display panel is keeping the same as the load of the pixel unit 20 inside the display panel. Therefore, there is not install an independent electrostatic protection circuit outside the display panel, then to be an advantage for the border space of the display panel with narrow border design.

What is claimed is:

1. A circuit of display panel, wherein comprising a signal wire extending along a first direction, a public electrode wire extending along a second direction, a pixel electrode, a first discharge circuit and a second discharge circuit, each signal wire is electrical connecting with the public electrode wire with the first discharge circuit and the second discharge circuit, the first discharge circuit and the second discharge circuit is in series, the pixel electrode is connecting on an intersection point between the first discharge circuit and the second discharge circuit, wherein the first discharge circuit and the second discharge circuit each comprises two thin film transistors, and each thin film transistor comprising a grid electrode, a source electrode and a drain electrode respectively, the grid electrode is electrically connecting with the drain electrode, the source electrode and the drain electrode of one thin film transistor are electrical connecting with the drain electrode and the source electrode of another thin film transistor of the first discharge circuit to be a close loop, the source electrode and the drain electrode of one thin film transistor are electrical connecting with the drain electrode and the source electrode of another thin film transistor of the second discharge circuit to be a close loop.

2. The circuit of display panel according to claim 1, wherein the first direction is vertical to the second direction.

3. The circuit of display panel according to claim 1, wherein a plurality of pixel units are combined by the intersecting with two parallel signal wires adjoining and two public electrode wires, the pixel units are arranging in array, and a pixel electrode is found from each pixel unit.

4. The circuit of display panel according to claim 1, wherein the pixel unit each is a dummy pixel unit.

5. The circuit of display panel according to claim 1, wherein a connect point of the drain electrode and the source electrode in the first discharge circuit is electrical connecting with another connect point of the drain electrode and the source electrode in the second discharge circuit.

6. The circuit of display panel according to claim 1, wherein a connect point is public electrode wire is electrically connecting with together, which the connect point of the drain electrode and the source electrode is form with the second discharge circuit and the first discharge circuit.

7. The circuit of display panel according to claim 1, wherein the signal wire is selected from a signal scan wire or a date wire for transferring the display signal.

* * * * *